(12) United States Patent
Wang et al.

(10) Patent No.: US 11,314,345 B2
(45) Date of Patent: Apr. 26, 2022

(54) METHOD AND APPARATUS FOR PERFORMING DIRECTIONAL OPERATION, AND STORAGE MEDIUM

(71) Applicant: BEIJING XIAOMI MOBILE SOFTWARE CO., LTD., Beijing (CN)

(72) Inventors: Yanjiong Wang, Beijing (CN); Zheng Li, Beijing (CN); Shan Chen, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 17/022,002

(22) Filed: Sep. 15, 2020

(65) Prior Publication Data

US 2021/0333889 A1     Oct. 28, 2021

(30) Foreign Application Priority Data

Apr. 26, 2020   (CN) ......................... 202010340448.3

(51) Int. Cl.
| | |
|---|---|
| G06F 3/038 | (2013.01) |
| G06F 3/0481 | (2022.01) |
| H04W 4/02 | (2018.01) |
| G01S 3/14 | (2006.01) |
| G06F 3/04817 | (2022.01) |

(52) U.S. Cl.
CPC ................ G06F 3/038 (2013.01); G01S 3/14 (2013.01); G06F 3/04817 (2013.01); H04W 4/026 (2013.01)

(58) Field of Classification Search
CPC ........ G06F 3/038; G06F 3/04817; G01S 3/14; H04W 4/026
See application file for complete search history.

(56) References Cited

U.S. PATENT DOCUMENTS

| | | | |
|---|---|---|---|
| 2013/0169546 A1 | 7/2013 | Thomas | |
| 2014/0325371 A1 | 10/2014 | Wilson et al. | |
| 2016/0277089 A1* | 9/2016 | Jung | ................... G06F 3/04883 |
| 2016/0370450 A1* | 12/2016 | Thorn | ...................... G01S 3/46 |

FOREIGN PATENT DOCUMENTS

| | | |
|---|---|---|
| CN | 103826007 A | 5/2014 |
| CN | 104718523 A | 6/2015 |
| WO | 2013123695 A1 | 8/2013 |

OTHER PUBLICATIONS

OA for CN application 202010340448.3, dated Feb. 23, 2021.
Search report for EP application 20198716.1, dated Mar. 24, 2021.

* cited by examiner

*Primary Examiner* — Tadesse Hailu
*Assistant Examiner* — Darrin Hope
(74) *Attorney, Agent, or Firm* — Syncoda LLC; Feng Ma

(57) ABSTRACT

A method for performing a directional operation includes: obtaining an operation directing to a target operation device; determining a direction of the operation, determining the target operation device matched with the direction of the operation; and performing the operation on the target operation device.

16 Claims, 13 Drawing Sheets

METHOD AND APPARATUS FOR PERFORMING DIRECTIONAL OPERATION, AND STORAGE MEDIUM

CROSS-REFERENCE TO RELATED APPLICATIONS

This application claims priority to Chinese Application No. 202010340448.3, filed on Apr. 26, 2020, the disclosure of which is hereby incorporated by reference in its entirety.

BACKGROUND

With the development of technologies, functions of a terminal are becoming more and more abundant, and work and daily life of a user are increasingly dependent on the terminal. The terminal may be used for mobile office, instant messaging, online shopping, entertainment, etc. While the terminal is used, a business operation may be performed between the terminal and other terminals. For example, files are transmitted between the terminals, the other terminals are controlled, and the terminal is controlled to present content.

SUMMARY

The present disclosure relates to a field of electronic technologies, and more particularly to a method and an apparatus for performing a directional operation, and a storage medium.

According to embodiments of the present disclosure, there is provided a method for performing a directional operation, which is applied to an operation implementing device. The method for performing the directional operation includes: obtaining an operation directing to a target operation device; determining a direction of the operation, and determining the target operation device matched with the direction of the operation; and performing the operation on the target operation device.

According embodiments of the present disclosure, there is provided a device for performing a directional operation. The device includes: a processor and a memory. The memory is configured to store executable instructions by the processor. The processor is configured to implement the method for performing the direction operation described above.

According to embodiments of the present disclosure, there is provided a non-transitory computer readable storage medium. When instructions in the storage medium are executed by a processor in a mobile terminal, the mobile device is enabled to implement the method for performing the direction operation described above.

It is to be understood that both the foregoing general description and the following detailed description are exemplary and explanatory only and are not restrictive of the present disclosure, as claimed.

BRIEF DESCRIPTION OF THE DRAWINGS

The accompanying drawings, which are incorporated in and constitute a part of this specification, illustrate embodiments consistent with the present disclosure, and serve to explain the principle of the present disclosure together with the description.

DETAILED DESCRIPTION

Exemplary embodiments will be described in detail herein, examples of which are illustrated in the accompanying drawings. When the following description refers to the accompanying drawings, the same or similar elements may be denoted by the same numerals in different accompanying drawings, unless otherwise indicated. The embodiments described in the following exemplary embodiments do not represent all embodiments consistent with the present disclosure. Instead, they are merely examples of apparatuses and methods consistent with aspects of the present disclosure as detailed in the appended claims.

When multiple terminals are associated to performing the business operation, the terminal needs to establish network connection with the multiple terminals related to performing the business operation. A target terminal is determined for performing the business operation, from the multiple terminals by obtaining device information of the target terminal within a limited distance.

Figure 1:
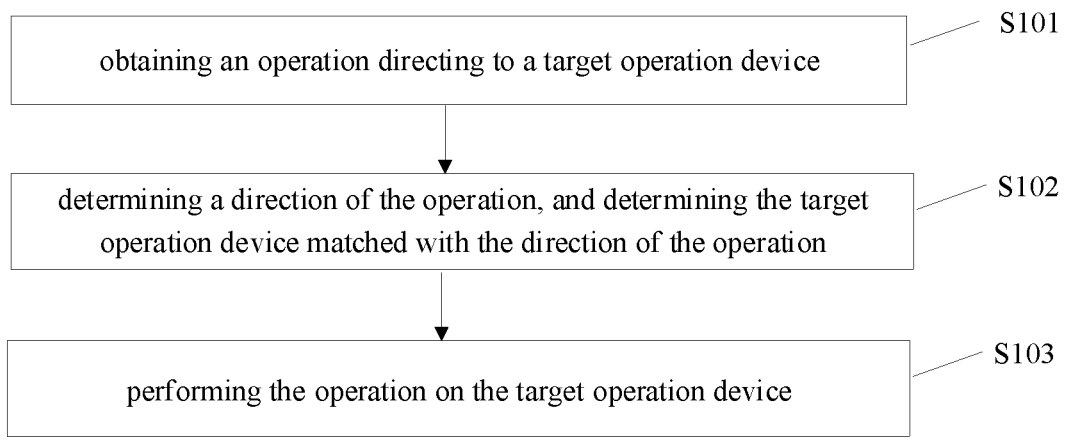
FIG. 1 is a flowchart illustrating a method for performing a directional operation according to some embodiments of the present disclosure.
Figure 2:
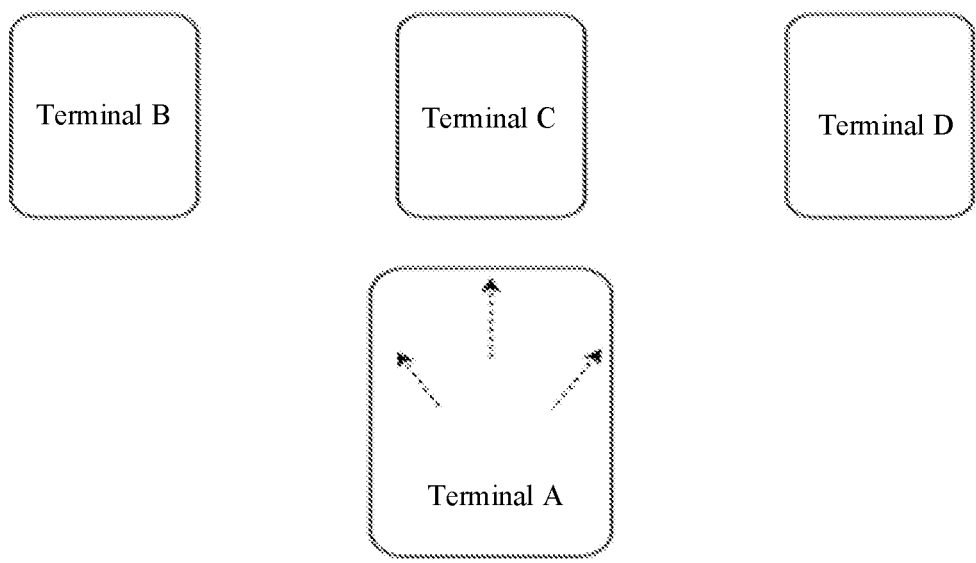
FIG. 2 is a schematic diagram illustrating a method for performing a directional operation according to some embodiments of the present disclosure.

FIG. 1 is a flowchart illustrating a method for performing a directional operation according to some embodiments of the present disclosure. FIG. 2 is a schematic diagram illustrating a method for performing a directional operation according to some embodiments of the present disclosure. As illustrated in FIG. 1 and FIG. 2, the method for performing the directional operation may be applied to an operation implementing device (e.g., a terminal A). The terminal A may be configured to perform an operation on at least one of candidate target operation devices, i.e., terminal B, terminal C and terminal D. The operation implementing device may be an electronic device having a display screen, such as a smart terminal, a smart tablet, a smart wearable device, a personal e-commerce assistant, or a personal computer.

As illustrated in FIG. 1 and FIG. 2, the method for performing the directional operation may include the following.

At block S101, an operation directing to a target operation device is obtained.

The operation that directs to the target operation device may be used to determine the target operation device. For example, an operation directing to the terminal B, the terminal C or the terminal D is obtained from the terminal A. It should be understood, there may be one or more target operation devices directed by the operation.

The operation directing to the target operation device may be a sliding operation that has a direction and is inputted by a user on a touch screen. In some embodiments, the operation implementing device includes the touch screen capable of recognizing the sliding operation and is configured to determine the direction of the operation directing to the target operation device.

The touch screen may recognize, based on a target directing operation (such as the sliding operation having the direction inputted by the user on the touch screen), a movement trajectory of the sliding operation and determine the direction of the operation directing to the target operation device.

As illustrated in FIG. 2, the terminal B is located on the front-left direction of the terminal A, the terminal C is located directly in front of the terminal A, and the terminal D is located on the front-right direction of the terminal A. In other words, the terminal B is located to the northwest of the terminal A, the terminal C is located to the north of the terminal A, and the terminal D is located to the northeast of the terminal A. That is, the target operation terminal pointed by the sliding operation having a northwestward direction on the touch screen of the terminal A is the terminal B. The target operation terminal pointed by the sliding operation having a northward direction on the touch screen of the terminal A is the terminal C. The target operation terminal directed by the sliding operation having a northeastward direction on the touch screen of the terminal A is the terminal D.

It should be understood, the operation directing to the target operation device may also be a movement that causes a direction pointed by the operation implementing device changed. For example, the operation implementing device may be swung to a pointing direction. The direction of a moving trajectory of the operation implementing device may be obtained by using a gyroscope, a gravity sensor, and a coprocessor carried by the operation implementing device.

At block S102, a direction of the operation is determined, and the target operation device matched with the direction of the operation is determined.

For example, the direction of the operation may be determined based on the moving trajectory of the operation directing to the target operation device.

The target operation device matched with the direction of the operation is determined based on an orientation of each of candidate target operation devices (i.e., the terminal B, the terminal C and the terminal D) with respect to the operation implementing device and the direction of the operation directing to the target operation device.

At block S103, the operation is performed on the target operation device.

At this block, the operation may be any of operations performed between the operation implementing device and the target operation device, including establishing a connection between the operation implementing device and the target operation device (the connection may be Bluetooth connection, WIFI connection, which is not limited here) and the like. Any of interaction operations may be performed between the operation implementing device and the target operation device after the connection is established. For example, the interaction operation may be a file transmission operation. That is, the terminal A transmits a file to the terminal B, the terminal C or the terminal D. As another example, the interaction operation may be an audio playing operation or a video playing operation. That is, the terminal A may send an audio or a video to the terminal B, the terminal C or the terminal D, such that the audio and the video are played by the terminal B, the terminal C or the terminal D. The present disclosure does not limit the interaction operation.

With embodiments of the present disclosure, by obtaining the operation directing to the target operation device, determining the direction of the operation, and determining the target operation device matched with the direction of the operation, the operation is performed on the target operation device. In this way, the target operation device is determined based on the operation having the pointing direction to operate the target operation device, thereby simplifying operation procedures, realizing an intelligent directional operation, and improving the user experience.

Figure 3:
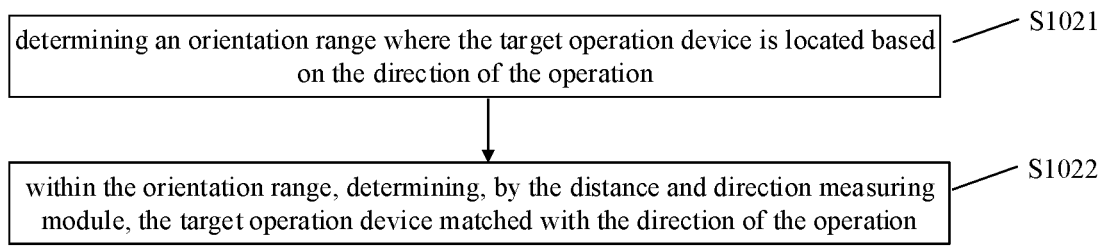
FIG. 3 is a flowchart illustrating a method for performing a directional operation according to some embodiments of the present disclosure.

FIG. 3 is a flowchart illustrating a method for performing a directional operation according to some embodiments of the present disclosure. The operation implementing device may include a distance and direction measuring module. As illustrated in FIG. 3, the block 102 of determining the target operation device matched with the direction of the operation illustrated in FIG. 1 may include the following.

At block S1021, an orientation range of the target operation device with respect to the operation implementing device is determined based on the direction of the operation.

The direction of the operation directing to the target operation device is determined, and the orientation range of the target operation device with respect to the operation implementing device is determined. That is, the target operation device matched with the operation that is from the operation implementing device and directs to the target operation device exists within the orientation range where the target operation device is located. Based on the direction of the operation directing to the target operation device from the user, the orientation range of the target operation device with respect to the operation implementing device is determined. The target operation device pointed by the operation may be determined within the determined orientation range, such that the directional operation is more convenient.

In an implementation, a correspondence between the direction of the operation and the orientation of the target operation device may be determined in advance. For example, the direction of the operation is formed by rotating a direction of a central axis of the operation implementing device to the left by x degrees. For example, the central axis of the operation implementing device refers to the central axis of a touch screen of the operation implementing device along the length direction or the width direction of the touch screen. The directly front direction of an operator of the operation implementing device may be rotated to the left by an angle range from x degrees subtracted by a first preset angle to x degrees added by the first preset angle, to obtain the orientation range where the target operation device is located. That is, the orientation range of the target operation device is formed by two boundaries, the first boundary forms an angle equaling to x degrees subtracted by the first preset angle with the directly front direction, and the second boundary forms an angle equaling to x degrees added by the first preset angle with the directly front direction. The directly front direction of the operation implementing device may be rotated to the left by an angle range from x degrees subtracted by a second preset angle to x degrees added by the second preset angle, to obtain an access range where the target operation device is located. That is, the access range wherein the target operation device is located is formed by two boundaries, the first boundary forms an angle equaling to x degrees subtracted by the second preset angle with the directly front direction, and the second boundary forms an angle equaling to x degrees added by the second preset angle with the directly front direction. The first preset angle is not greater than the second preset angle. It may be understood, the direction of the operation may be determined by rotating the direction of the central axis of the operation implementing device to the right, or not rotating the direction of the central axis of the operation implementing device (at the directly front of the operation implementing device), which is not elaborated here.

At block S1022, within the orientation range, the target operation device matched with the direction of the operation is determined by the distance and direction measuring module.

The distance and direction measuring module arranged on the operation implementing device may be configured to determine a relative distance and/or a relative direction of each candidate target operation device within the orientation range with respect to the operation implementing device. Based on the relative distance and/or the relative direction of each candidate target operation device with respect to the operation implementing device, the target operation device matched with the direction of the operation is determined from the candidate target operation devices. By determining the target operation device matched with the direction of the operation from the candidate target operation devices located within the orientation range, the choices of the target operation device are narrowed down, thereby increasing a speed of the directional operation and improving the accuracy.

Figure 4:
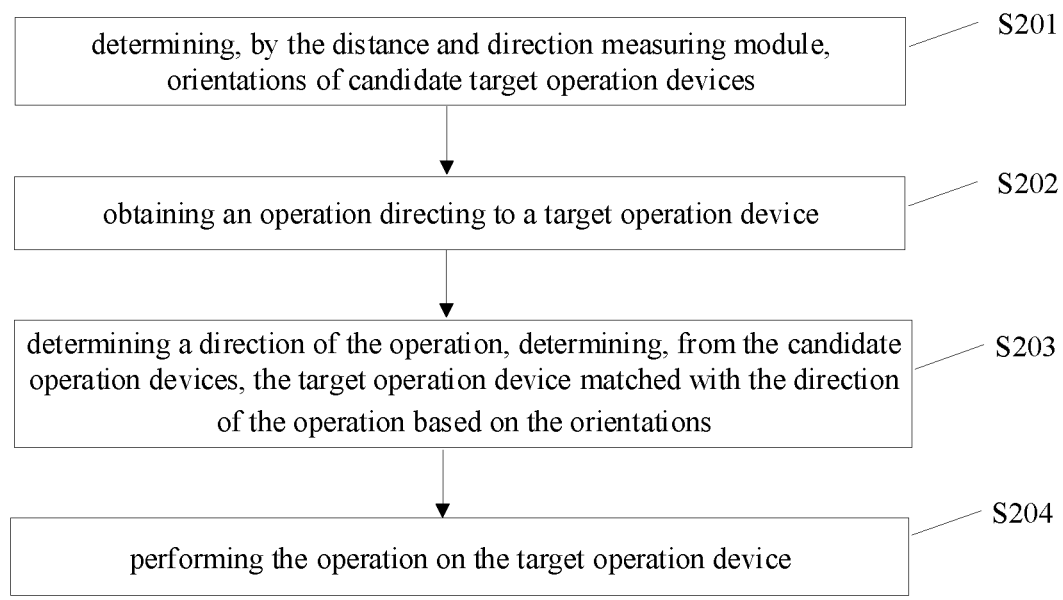
FIG. 4 is a flowchart illustrating a method for performing a directional operation according to some embodiments of the present disclosure.

FIG. 4 is a flowchart illustrating a method for performing a directional operation according to some embodiments of the present disclosure. The operation implementing device may include the distance and direction measuring module. As illustrated in FIG. 4, the method for performing the directional operation may include the following.

At block S201, orientations of multiple candidate target operation devices are determined by the distance and direction measuring module.

The distance and direction measuring module arranged on the operation implementing device may be configured to determine a relative distance and a relative direction of each candidate target operation devices, that is located within a working range of the distance and direction measuring module, with respect to the operation implementing device.

In some embodiments, the orientations of the multiple candidate target operation devices determined by the distance and direction measuring module may be saved, such that the saved orientations of the candidate target operation devices may be directly utilized during the directional operation, thereby improving the speed of the directional operation and further improving the user experience. It may be understood, the orientations of the multiple candidate target operation devices may also be utilized to perform other operations by the operation implementing device.

In practice, the method for performing the directional operation according to embodiments of the present disclosure may be implemented by a preset application (APP) for example. The block S201 may be performed, in response to launching the APP or entering an interface for implementing the method for performing the directional operation.

At block S202, an operation directing to the target operation device is obtained.

At block S203, a direction of the operation is determined, and the target operation device matched with the direction of the operation is determined from the multiple candidate operation devices based on the orientations.

The direction of the operation directing to the target operation device is determined, the orientations of the multiple candidate target operation devices are determined by the distance and direction measuring module, and the target operation device matched with the direction of the operation is determined from the multiple candidate operation devices.

At block S204, the operation is performed on the target operation device.

In some embodiments, if an orientation of a candidate target operation device with respect to the operation implementing device and the direction of the operation conform to a preset angle relationship, the candidate target operation device is determined as the target operation device.

The preset angle relationship may be set in advance by the user based on a usage preference and a usage scene. For example, the candidate target operation device that the orientation of said candidate target operation device with respect to the operation implementing device and the direction of the operation conform to the preset angle relationship may be determined as the target operation device. Given that a preset angle is 10 degrees, the preset angle relationship may be that an angle is less than 10 degrees, such that if an angle formed by the orientation of a candidate target operation device with respect to the operation implementing device and the direction of the operation is within a range of 0 degree to 10 degrees, the candidate target operation device may be determined as the target operation device. In an example, it may be determined that the direction of the operation forms an angle of 30 degrees on the left side with respect to the direction of the central axis of the operation implementing device based on an angle formed by the sliding operation and the central axis of the operation implementing device. The multiple candidate target operation devices may be in front of the operation implementing device, and the orientations of the multiple candidate target operation devices may respectively form an angle of 32 degrees on the left side with respect to the direction of central axis of the operation implementing device, an angle of 67 degrees on the left side with respect to the direction of the central axis, and an angle of 35 degrees on the right side with respect to the direction of the central axis. In this case, the angle of 32 degrees on the left side with respect to the central axis may be determined as conforming to the preset angle relationship, and the candidate target operation device corresponding to that angle may be determined as the target operation device.

In another example, if a relationship between the orientation of a candidate target operation device with respect to the operation implementing device and the direction of the operation conforms to the preset angle relationship, as well as a distance from the candidate target operation device to the operation implementing device conforms to a preset distance condition, the candidate target operation device may be determined as the target operation device.

For example, there are multiple candidate target operation devices on approximate directions with respect to the operation implementing device. The target operation device may be determined based on the orientation and distance of the candidate target operation devices with respective to the operation implementing device. Returning back to the above example, in a case that orientations of two candidate target operation devices conform to the preset angle relationship, for example, the two candidate target operation devices are in front of the operation implementing device, and the orientations of the two candidate target operation devices with respect to the operation implementing device are an angle of 32 degrees on the left side with respect to the central axis and an angle of 36 degrees on the left side with respect to the central axis respectively, the target operation device may be determined based on the distances of the two candidate target operation devices from the operation implementing device.

In some embodiments, a distance threshold may be set in advance. When the orientation with respect to the operation implementing device and the direction of operation conform to the preset angle relationship, a candidate target operation device having a distance from the operation implementing device being less than the preset distance threshold is determined as the target operation device. A distance threshold range may also be set in advance. When the orientation with respect to the operation implementing device and the direction of the operation conform to the preset angle relationship, the candidate target operation device having the distance from the operation implementing device being within the preset distance threshold range is determined as the target operating device, which may accurately orient the target operation device and allow the directional operation convenient.

In some embodiments, the target operation device may be determined based on the sliding operations having different pointing directions and inputted by the user on the touch screen. A correspondence between a length of the sliding operation (i.e., a length of a sliding trajectory) or a gesture (i.e., the gesture of the sliding operation) and the distance may be set in advance. That is, in embodiments, if the orientation of a candidate target operation device with respect to the operation implementing device and the direction of the operation conform to the preset angle relationship, as well as the distance from the candidate target operation device to the operation implementing device conforms to the preset distance condition, the candidate target operation device is determined as the target operation device.

Figure 5:
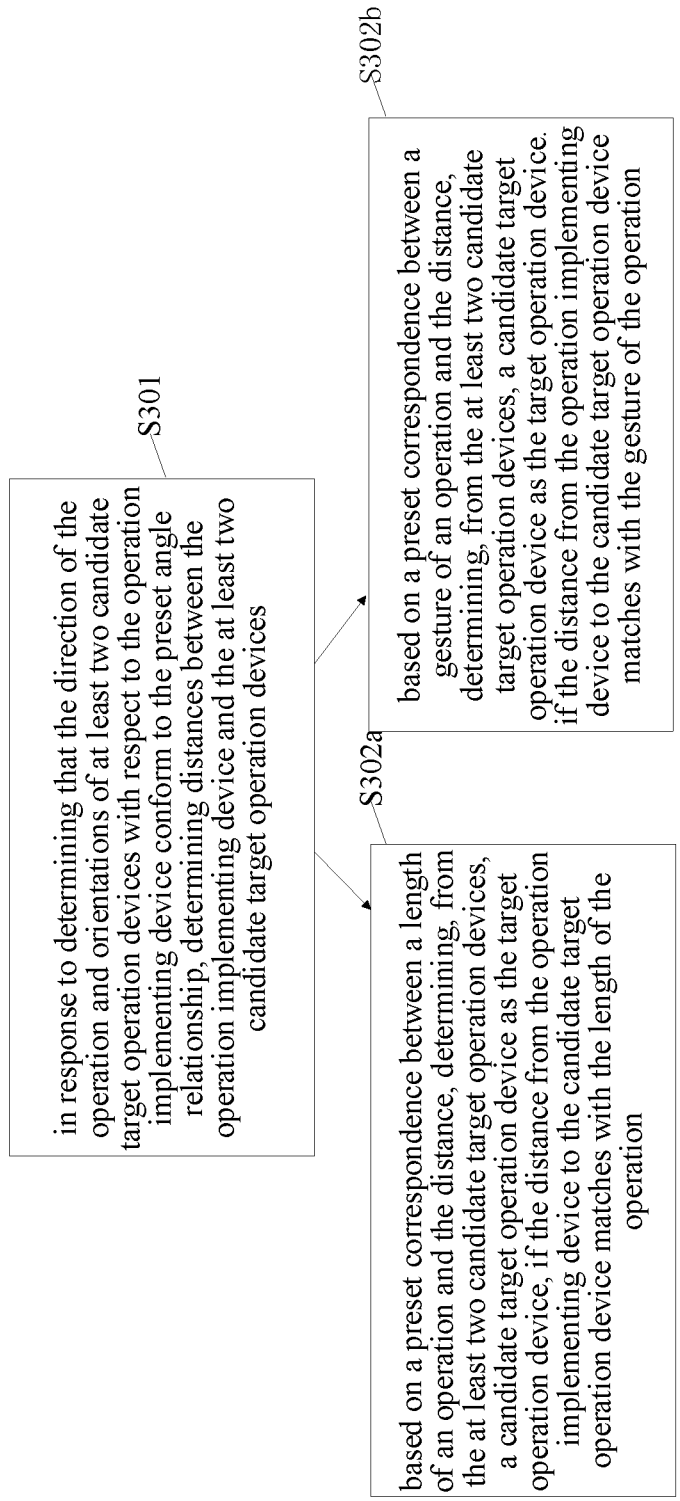
FIG. 5 is a flowchart illustrating determination of a target operation device according to some embodiments of the present disclosure.

FIG. 5 is a flowchart illustrating determination of a target operation device according to some embodiments of the present disclosure. As illustrated in FIG. 5, the target operation device may be determined by the following.

At block S301, in response to determining that the orientations of at least two candidate target operation devices with respect to the operation implementing device and the direction of the operation conform with the preset angle relationship, distances between the operation implementing device and the at least two candidate target operation devices are determined.

At block S302a, based on a preset correspondence between the length of the operation directing to the target operation device and the distance, a candidate target operation device having a distance from the operation implementing device matching with the length is determined from the at least two candidate target operation devices as the target operation device.

As another example, at block S302b, based on a preset correspondence between the gesture of the operation directing to the target operation device and the distance, a candidate target operation device having a distance from the operation implementing device that matches with the gesture is determined from the at least two candidate target operation devices as the target operation device.

For example, when angles of multiple candidate target operation devices with respect to the operation implementing device all conform to the preset angle relationship, the candidate target operation device having a corresponding distance from the operation implementing device may be determined as the target operation device, based on the length of the sliding trajectory of the sliding operation performed on the operation implementing device. When the length of the sliding trajectory is relatively long, the candidate target operation device having a long distance from the operation implementing device may be determined as the target operation device. When the length of the sliding trajectory is relatively short, the candidate target operation device having a short distance from the operation implementing device may be determined as the target operation device. The above may allow flexible directional operation and make operation convenient. In some embodiments, the correspondence between the length of the sliding trajectory of the sliding operation and the distance of the target operation device may be stored in advance. A first range of the length of the sliding trajectory may correspond to a first range of the distance of the target operation device, whereas a second range of the length of the sliding trajectory may correspond to a second range of the distance of the target operation device, and so on. The first length is less than the second length, the first range of the length is less than the second range of the length, and so on.

As another example, different gestures of the sliding operation may be set in advance to distinguish target operation devices of different distances. The sliding operation with a single finger may correspond to the target operation device that is close to the operation implementing device, while the sliding operation with two or more fingers may correspond to the target operation device that is far away from the operation implementing device.

Figure 6:
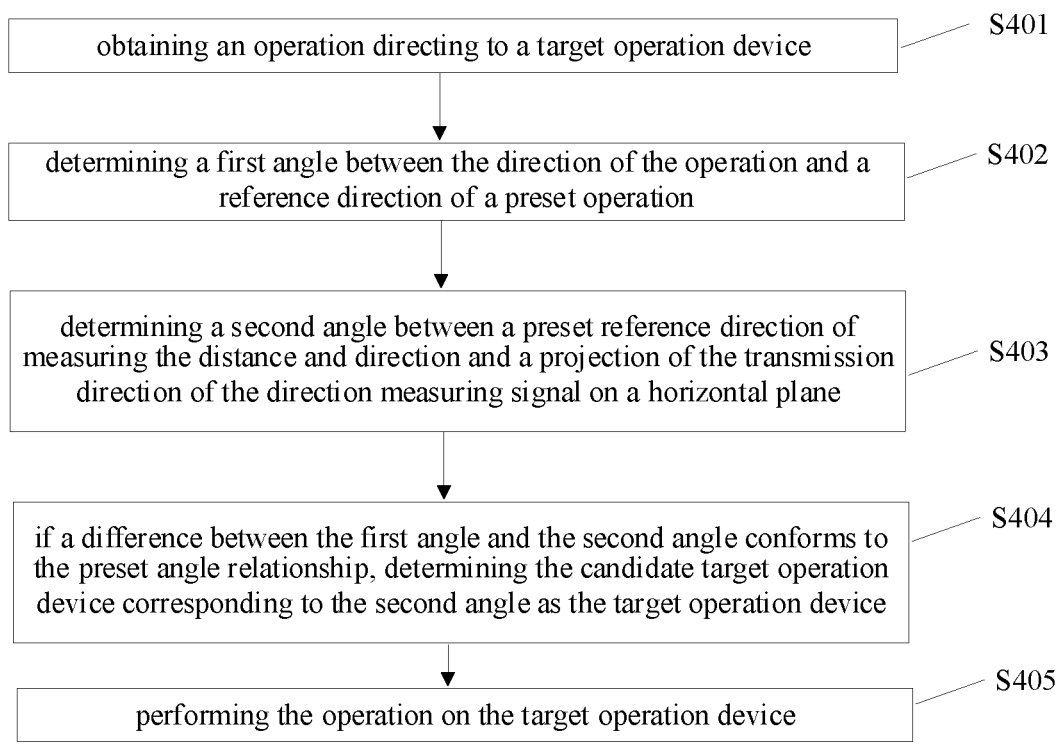
FIG. 6 is a flowchart illustrating a method for performing a directional operation according to some embodiments of the present disclosure.

In some embodiments, the orientation of the target operation device with respect to the operation implementing device may include a transmission direction of a direction measuring signal transmitted between the target operation device and the operation implementing device. FIG. 6 is a flowchart illustrating a method for performing a directional operation according to some embodiments of the present disclosure. As illustrated in FIG. 6, the method for performing the directional operation may include the following.

At block S401, an operation directing to the target operation device is obtained.

At block S402, a first angle between the direction of the operation and a reference direction of a preset operation is determined.

At block S403, a second angle between a projection, on a horizontal plane, of the transmission direction of the direction measuring signal transmitted between the candidate target operation device and the operation implementing device and a preset reference direction of measuring the distance and direction is determined.

At block S404, if a difference between the first angle and the second angle conforms to the preset angle relationship, a candidate target operation device corresponding to the second angle is determined as the target operation device.

At block S405, an operation is performed on the target operation device.

The operation directing to the target operation device is an operation implemented on the operation implementing device, such as a sliding operation. The operation is performed on the screen of the operation implementing device, such that the direction of the operation is also on a plane where the screen is located. The direction measuring signal is transmitted within a transmission space, such that the transmission direction of the direction measuring signal is also within the transmission space and spatial. When determining the target operation device pointed by the operation based on the angle relationship between the direction of the operation and the transmission direction of the direction measuring signal, respective reference directions of both the direction of the operation and the transmission direction of the direction measuring signal are determined. The direction of the operation and the transmission direction of the direction measuring signal are respectively compared with their reference directions to determine the target operation device based on comparison results.

In some embodiments, the direction measuring signal may be transmitted by the distance and direction measuring module. For example, the distance and direction measuring module is a UWB (ultra-wide band) module. The direction measuring signal may be a UWB signal (e.g., a pulse signal of which a bandwidth is greater than 500 MHz or a ratio of a baseband bandwidth to a carrier frequency is greater than 0.2). The distance and direction measuring module may usually determine an angle and a position of a counterpart node through the direction measuring signal. A transmission direction of the direction measuring signal sent by the counterpart node may be directly obtained by the distance and direction measuring module for subsequent operations. The transmission direction of the direction measuring signal may also be expressed as an incident angle (i.e., an angle between a light source and a normal direction) of a pulse signal sent by the counterpart node, such that a radial connection line between a sending end and a receiving end is obtained. The method for obtaining the transmission direction of the direction measuring signal may be similar to existing methods for the distance and direction measuring module in the related art, which may not be elaborated here.

In an implementation, the reference direction of the preset operation may be determined for the direction of operation directing to the target operation device, and the preset reference direction of measuring the distance and direction may be determined for the transmission direction of the direction measuring signal. The direction of the operation directing to the target operation device may be characterized by the first angle between the direction of the operation and the reference direction of the preset operation. The transmission direction of the direction measuring signal may be characterized by the second angle between the transmission direction of the direction measuring signal transmitted between the candidate target operation device and the operation implementing device and the preset reference direction of measuring the distance and direction. The target operation device is determined based on a relationship between a value of the first angle and a value of the second angle.

In another implementation, coordinate transformation may be performed on the direction of the operation directing to the target operation device and the transmission direction of the direction measuring signal. That is, the direction of the operation directing to the target operation device and the transmission direction of the direction measuring signal are converted into a same coordinate system, to determine the angle relationship between them through a single reference direction, such that the target operation device is determined.

As discussed above, many ways are provided to determine the reference direction of the operation directing to the target operation device and the reference direction of the transmission direction of the direction measuring signal. The target operation device may be determined based on the reference directions and the angle relationship of angles with respect to these reference directions. The implementation of determining the angle relationship of angles of the direction of the operation directing to the target operation device and the transmission direction of the direction measuring signal with respect to the reference directions is not limited herein. Any of ways for determining the target operation device based on the direction of the operation directing to the target operation device and the transmission direction of the direction measuring signal that utilizes ideas of the present disclosure should fall within the protection scope of the present disclosure.

Figure 7A:
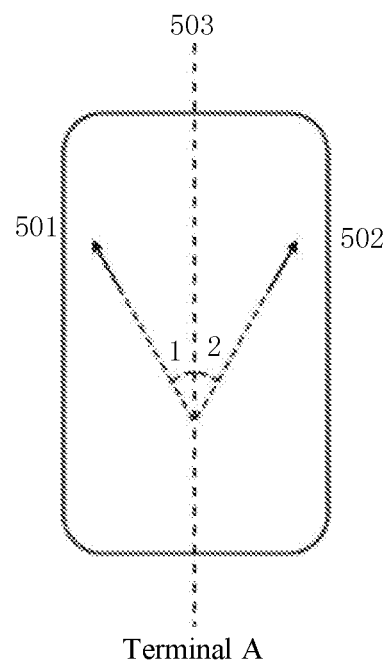
FIG. 7A is a schematic diagram illustrating a method for determining a first angle according to some embodiments of the present disclosure.

FIG. 7A is a schematic diagram illustrating a method for determining a first angle according to some embodiments of the present disclosure.

The orientation of each candidate target operation device with respect to the operation implementing device may be determined according to the transmission direction of the direction measuring signal transmitted between each candidate target operation device and the operation implementing device. The direction measuring signal is sent or received by the distance and direction measuring module of the operation implementing device, and each candidate target operation device correspondingly receives or sends the direction measuring signal. Therefore, the operation implementing device may determine the orientation of each candidate target operation device with respect to the operation implementing device.

As illustrated in FIG. 7A, each of arrows 501 and 502 indicates a direction or an approximate direction of the operation directing to the target operation device on the terminal A. The direction along a straight line where a dashed line 503 is located may be the direction of a central axis of the operation implementing device, i.e., the reference direction of the preset operation. The reference direction of the preset operation is the reference direction for determining the direction of the operation. The first angle is formed by the direction of the operation and the reference direction of the preset operation, i.e., the angle 1 and the angle 2 illustrated in FIG. 7A. The angle 1 and the angle 2 each is used to indicate an included angle of the direction of the operation with respect to the reference direction of the preset operation. Although there are two directions along the central axis, based on a usage habit, a direction consistent with the direction of the sliding operation may be taken as the reference direction of the preset operation, for example the direction is upward.

Figure 7B:
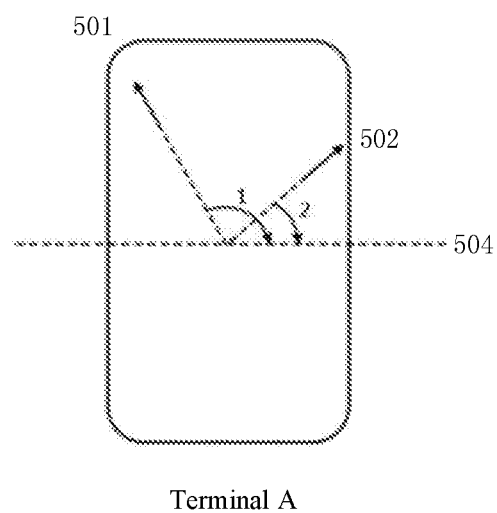
FIG. 7B is a schematic diagram illustrating a reference direction of a preset operation according to some embodiments of the present disclosure.

As illustrated in FIG. 7B, a direction along a straight line 504 perpendicular to the central axis 503 and within the plane where the screen of the operation implementing device is located may be determined as the reference direction of the preset operation (the direction is leftward or rightward, which is not limited here). In this case, according to the directions, indicated by the arrows 501 and 502, of the operations directing to the target operation devices, values of the angle 1 and the angle 2 are different from those of FIG. 7A, which does not depart from a design idea of the present disclosure. In cases of multiple ways to determine the angles, the reference direction of the preset operation that is convenient to compare the first angle and the second angle may be determined based on a manner for determining the angle of the orientation of the candidate target operation device with respect to the operation implementing device.

When determining the target operation device from the candidate target operation devices, the candidate target operation device corresponding to the second angle may be determined as the target operation device if the second angle has a difference from the first angle conforming to the preset angle threshold. That is, if the difference between the first angle and the second angle conforms to the preset angle threshold, the candidate target operation device corresponding to the second angle is determined as the target operation device. In other words, the orientation of the target operation device with respect to the operation implementing device is same to or approximately same to the direction of the operation directing to the target operation device, such that the target operation device may be determined accurately.

In some embodiments, the reference direction of the preset operation includes the direction along the central axis of the operation implementing device. When the operation implementing device and the candidate target operation devices are located in a same horizontal plane, the direction along the central axis of the operation implementing device or the direction along the straight line that is perpendicular to the central axis and is within the plane where the operation implementing device is located may also be determined as the preset reference direction of measuring the distance and direction (it should be noted that when different preset reference directions of measuring the distance and direction are employed, the angle relationship between the first angle and the second angle are also different, and the first angle and the second angle may be determined based on the different reference directions of measuring the distance and direction, which are not elaborated here). However, in some cases, it is likely that the operation implementing device and the candidate target operation devices are not located within the same horizontal plane. An offset direction and an included angle of the direction of the operation directing to the target operation device with respect to the central axis of the operation implementing device are used to represent the offset direction and the included angle of the pointed target operation device with respect to the operation implementing device. Taking FIG. 2 as an example, the sliding operation having a front-left direction to the terminal A is used to point to the terminal B located to the upper left of the terminal A. In this case, the offset of the terminal B with respect to the terminal A focuses on the leftward or rightward direction with respect to the terminal A, without taking the offset on the upward or downward direction with respect to the terminal A into account. However, when the operation implementing device and the candidate target operation devices are not located in the same horizontal plane, the direction measuring signal is a spatial signal. The offset of the transmission direction of the direction measuring signal in the vertical direction may affect the spatial angle and further affect the accuracy of obtaining the target operation device.

Therefore, the offset of the transmission direction of the direction measuring signal in the vertical direction can be removed to determine the target operation device. That is, the projection, on the horizontal plane, of the transmission direction of the direction measuring signal transmitted between the candidate target operation device and the operation implementing device may be determined, and the second angle between the projection and the preset reference direction of measuring the distance and direction may be determined. The preset reference direction of measuring the distance and direction may be determined as follows. A plane perpendicular to the plane where the operation implementing device is located and parallel to the central axis or containing the central axis is determined, and a direction of an intersection line between the plane and the horizontal plane is determined as the present reference direction of measuring the distance and direction. In other words, if the surface of the operation implementing device is flat (such as, a mobile phone or a tablet), the plane where the flat surface is located is taken as a first plane where the operation implementing device is located. A second plane perpendicular to the first plane and parallel to or containing the central axis of the operation implementing device is determined. The intersection line between the second plane and the horizontal plane is determined. The direction along the intersection line is the preset reference direction of measuring the distance and direction. Certainly, the straight line has two directions, any one of them may be taken as the preset reference direction of measuring the distance and direction based on actual requirements, or a direction matched with the reference direction of the preset operation may be determined as the preset reference direction of measuring the distance and direction. In a case that the reference direction of the preset operation is the upward direction along the central axis from the bottom to the top of the operation implementing device, the direction along the intersection line and faced by the operator of the operation implementing device may be determined as the preset reference direction, that is, the direction along the intersection line from the operator to an opposite side of the operator is determined (in this case, the operator holds the operation implementing device in front of him/her for operation).

Figure 8:
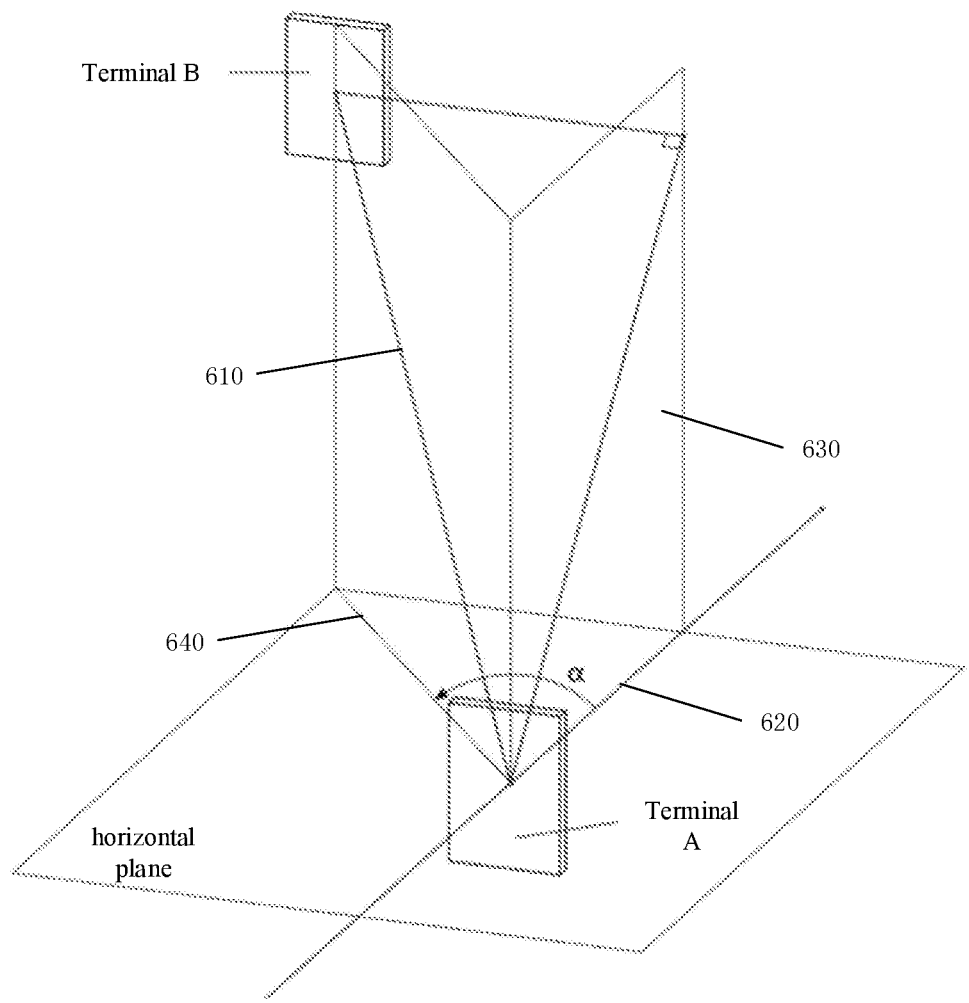
FIG. 8 is a schematic diagram illustrating a method for determining a second angle according to some embodiments of the present disclosure.

FIG. 8 is a schematic diagram illustrating a method for determining a second angle according to some embodiments of the present disclosure. As illustrated in FIG. 8, the terminal A may be the operation implementing device, and the terminal B may be the candidate target operation device. A straight line 610 illustrated in FIG. 8 indicates the transmission direction of the direction measuring signal transmitted between the candidate target operation device (terminal B) and the operation implementing device (terminal A). A plane where a certain surface of the terminal A is located is the first plane. In this case, the certain surface is the screen surface. The second plane perpendicular to the first plane and containing the central axis of the terminal A is determined, as indicated by 630. The direction along the intersection line (i.e., the direction along the straight line 620) between the plane 630 and the horizontal plane is the preset reference direction of measuring the distance and direction. The preset reference direction of measuring the distance and direction is used as a reference for determining an orientation relationship between the terminal B and the operation implementing device (terminal A). The straight line 610 indicating the transmission direction of the direction measuring signal is projected to the horizontal plane to obtain the straight line 640. The included angle α between the straight line 640 and the straight line 620 is the second angle between the transmission direction of direction measuring signal transmitted between the terminal B and the operation implementing device (terminal A) and the preset reference direction of measuring the distance and direction. The second angle is used to characterize the orientation of the candidate target operation device with respect to the operation implementing device.

Further, when there are multiple terminals B, after the first angle and multiple second angles are determined, if an angle difference between the first angle and a second angle conforms to the preset angle relationship, the candidate target operation device corresponding to the second angle is determined as the target operation device. In some embodiments, in combination with the implementation of determining the orientation of the candidate target operation device illustrated FIG. 8, the method for determining the first angle illustrated in FIG. 7A may be employed to determine the direction of the operation performed on the operation implementing device. The candidate target operation device corresponding to the second angle that has a same offset direction as the first angle and has a smallest value difference with the first angle may be determined as the target operation device. In some cases, another candidate target operation device (terminal C) may exist in addition to the terminal B illustrated in FIG. 8. The orientation of the terminal B form an angle of 32 degrees on the left side with respect to the central axis, while the orientation of the terminal C form an angle of 36 degrees on the left side with respect to the central axis. When the direction of the sliding operation obtained by the terminal A form an angle of 30 degrees on the left side with respect to the central axis, the terminal B may be determined as the target operation device. When the orientation of the terminal C form an angle of 20 degrees on the right side, the terminal B is also determined as the target operation device.

In other embodiments, the method for determining the first angle illustrated in FIG. 7B may be employed to determine the direction of operation performed on the operation implementing device, but performing the angle conversion between the first angle and the second angle is only for conveniently comparing them, which is not elaborated here.

Figure 9:
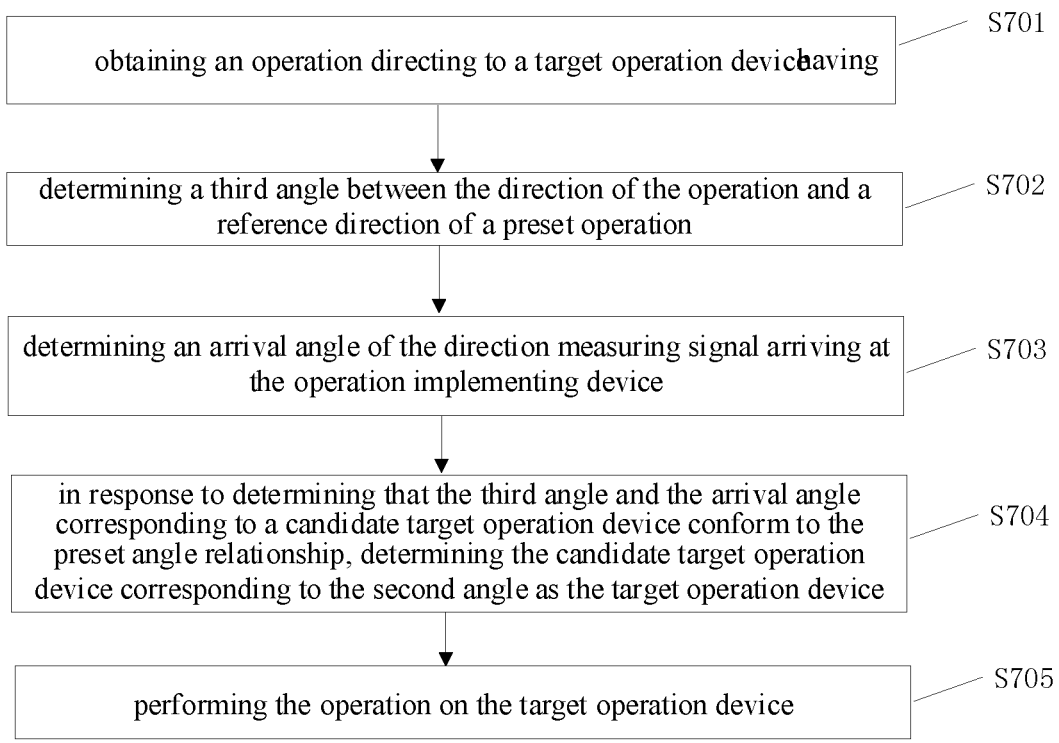
FIG. 9 is a flowchart illustrating a method for performing a directional operation according to some embodiments of the present disclosure.

In some embodiments, the orientation of the target operation device with respect to the operation implementing device may include an arrival angle of the direction measuring signal arriving at the operation implementing device. FIG. 9 is a flowchart illustrating a method for performing a directional operation according to some embodiments of the present disclosure. As illustrated in FIG. 9, the method for performing the directional operation may include the following.

At block S701, an operation directing to a target operation device is obtained.

At block S702, a third angle between the direction of the operation and the reference direction of the preset operation is determined.

At block S703, an arrival angle of the direction measuring signal between the candidate target operation device and the operation implementing device arriving at the operation implementing device is determined.

At block S704, if the arrival angle and the third angle conform to a preset angle relationship, the candidate target operation device corresponding to the arrival angle is determined as the target operation device.

At block S705, the operation is performed on the target operation device.

In some embodiments, the distance and direction measuring module may be configured to provide the transmission direction of the direction measuring signal received. The straight line where the transmission direction of the direction measuring signal is located is projected on the horizontal plane, and the second angle is obtained from the projection and the preset reference direction of measuring the distance and direction. That is, the coordinate transformation is performed on the transmission direction of the direction measuring signal, to obtain a second angle that could be compared with the first angle. In some embodiments, the arrival angle obtained by the distance and direction measuring module may be directly used without performing the coordinate transformation on the transmission direction of the direction measuring signal. That is, the candidate target operation device corresponding to the arrival angle that an angle relationship between the arrival angle and the third angle conforms to the preset angle relationship is determined as the target operation device.

The determination for the third angle is similar to the determination for the first angle in the above embodiment, which is not be elaborated here.

However, the number of antennas and the positions of antennas of the terminal may have an impact on the arrival angle. Therefore, the arrival angle may be determined by: determining, from multiple antennas included in the distance and direction measuring module of the operation implementing device, two antennas such that a direction of connection line of the two antennas is horizontal, based on a current posture (position and orientation) of the operation implementing device; and determining the arrival angle based on angles of the direction measuring signals arriving at the operation implementing device determined by the two antennas.

Figure 10:
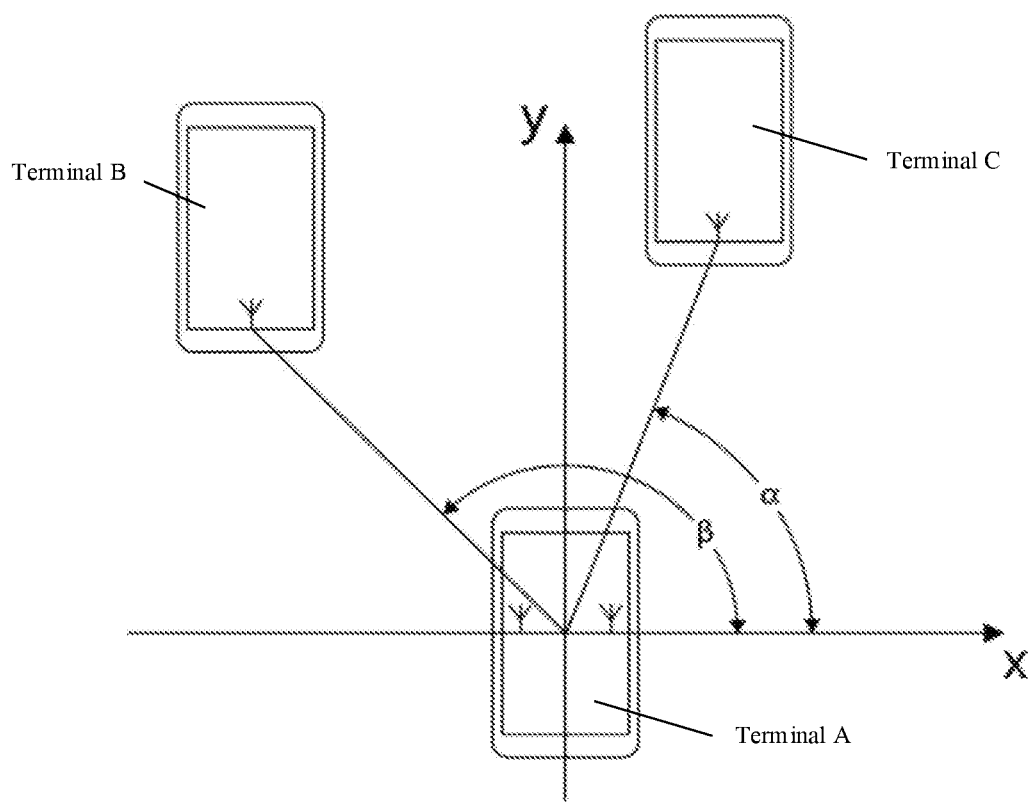
FIG. 10 is a schematic diagram illustrating determination of an arrival angle according to some embodiments of the present disclosure.

FIG. 10 is a schematic diagram illustrating determination of an arrival angle according to some embodiments of the present disclosure. As illustrated in FIG. 10, the terminal A is the operation implementing device, the terminal B and the terminal C are the candidate target operation devices, and α and β respectively correspond to arrival angles of direction measuring signals sent by the terminal B and the terminal C with respect to the terminal A.

In some cases, the distance and direction measuring module of the terminal A may include two antennas. The connection line between the two antennas is a reference to determine the arrival angle. The arrival angle obtained based on the two antennas is the angle between a received income direction measuring signal and the connection line between the two antennas. Based on the above, in embodiments, more attention is generally paid to a horizontal offset between the positions of the candidate target operation devices (the terminal B and terminal C) and the position of the operation implementing device (terminal A). If the connection line between the two antennas is horizontal or close to horizontal (an error angle may be set, and it is considered that the connection line between the two antennas is horizontal, when a difference is within the error angle) with respect to the position and the orientation of the operation implementing device (terminal A), the arrival angles of the received direction measuring signals sent by candidate target operation devices (i.e., the terminal B and the terminal C) may be considered as angles within the horizontal plane, i.e., the arrival angles characterize included angles of the positions of the terminal B and the terminal C with the horizontal direction.

In some embodiments, in combination with FIG. 10 illustrating the orientations of the candidate target operation devices, the method for determining the first angle illustrated in FIG. 7B may be employed to determine the direction of the operation obtained on the operation implementing device. However, since a horizontal-direction-angle ranges from 0 degree to 180 degrees, if the preset reference direction used for obtaining the third angle is perpendicular to the central axis of the operation implementing device (such as, the direction indicated by the straight line 504 in FIG. 7B), and if the reference direction for obtaining the arrival angle provided by the distance and direction measuring module is a positive direction of x axis in FIG. 10, the positive direction of the x axis perpendicular to the central axis may be determined as the preset reference direction, to facilitate the comparison between the third angle and the arrival angle. Certainly, a negative direction of the x axis perpendicular to the central axis may also be determined as the preset reference direction, with the angle conversion. In the same way, if the reference direction for obtaining the arrival angle provided by the distance and direction measuring module is the negative direction of the x axis in FIG. 10, the negative direction of the x axis perpendicular to the central line may be determined as the preset reference direction to facilitate the comparison between the third angle and the arrival angle, or the positive direction of the x axis perpendicular to the central line may also be determined as the preset reference direction, which is not be elaborated here.

If the angle difference between the second angle and the first angle is smallest, the candidate target operation device corresponding to the second angle may be determined as the target operation device. For example, as illustrated in FIG. 10, the positive direction of the x axis is taken as the reference directions, the arrival angle corresponding to the terminal C is 63 degrees, the arrival angle corresponding to the terminal B is 127 degrees in FIG. 10, and an angle between the sliding operation obtained by the terminal A and the positive direction of the x axis is 60 degrees, the terminal C may be determined as the target operation device.

In addition, the central axis of the operation implementing device may also be determined as the reference direction of the preset operation (such as, the direction indicated by the straight line 503 in FIG. 7A). The angle conversion may be performed accordingly on the third angle and the arrival angle. For example, the arrival angle α between 0 and 90 degrees corresponds to a candidate target operation device that forms an angle on the right side with respect to the central axis. For example, the candidate target operation device is the terminal C. The arrival angle β between 90 and 180 degrees corresponds to a candidate target operation device that forms an angle on the left side with respect to the central axis. For example, the candidate target operation device is the terminal B. Therefore, the reference for determining the arrival range and the reference for determining the third angle are the same, to make the comparison of the third angle and the arrival angle easy.

Figure 11A:
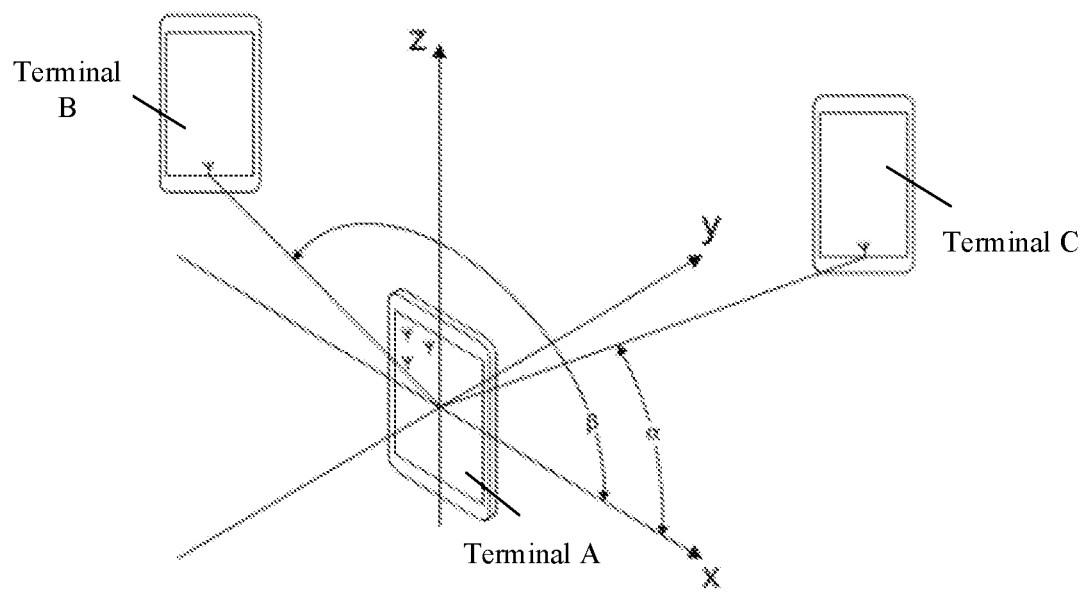
FIG. 11A is a first schematic diagram illustrating determination of an arrival angle according to some embodiments of the present disclosure.
Figure 11B:
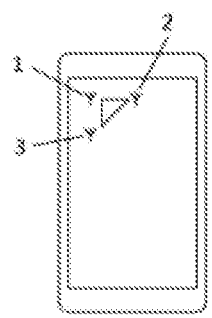
FIG. 11B is a second schematic diagram illustrating determination of an arrival angle according to some embodiments of the present disclosure.

FIG. 11A and FIG. 11B are schematic diagrams illustrating determination of an arrival angle according to some embodiments of the present disclosure. As illustrated in FIG. 11A, the terminal A is the operation implementing device, the terminal B and the terminal C are the candidate target operation devices, and α and β respectively correspond to arrival angles of direction measuring signals sent by the terminal B and the terminal C with respect to the terminal A.

In some cases, the distance and direction measuring module of the terminal A includes three antennas. Two antennas are determined based on a position and an orientation of the terminal A such that a connection line between these two antennas is horizontal or close to horizontal. The angle, determined by the two antennas, of the direction measuring signal arriving at the operation implementing device is obtained, and the arrival angle is determined according to the angle. FIG. 11B schematically illustrates a layout of antennas contained in the distance and direction measuring module of the terminal A. The distance and direction measuring module of the terminal A includes three antennas. When the terminal A is upright, a connection line between an antenna 1 and an antenna 2 is horizontal and a connection line between the antenna 1 and an antenna 3 is vertical. For the terminal A, as long as the connection line between the antenna 1 and the antenna 2 is horizontal under the position and the orientation of the terminal A, the arrival angle of the direction measuring signal determined based on the antenna 1 and the antenna 2 may be used. The arrival angle may represent an angle formed by the corresponding candidate target operation device with respect to the operation implementing device in the horizontal direction. Accordingly, when the position and orientation the terminal A change, for example, the terminal A is rotated by 90 degrees clockwise or counterclockwise from the upright direction illustrated in FIG. 11B, the connection line between the antenna 1 and the antenna 3 is horizontal. The arrival angle of the direction measuring signal determined based on the antenna 1 and the antenna 3 may be used. The arrival angle represents the angle formed by the corresponding candidate target operation device with respect to the operation implementing device in the horizontal direction. After the two antennas for providing angle data is determined based on the position and orientation of the terminal, the arrival angle may be determined based on the above two antennas, which is not elaborated here.

In some embodiments, the current position and orientation of the terminal may be determined by a sensor of the terminal, such as an angle velocity sensor, a speed sensor, etc., which is not limited here. The correspondence between the layout of the antennas contained in the distance and direction measuring module of the terminal and the position and the orientation of the terminal may be determined in advance. Before the target operation device is determined, the two antennas are determined such that the connection line of the two antennas is horizontal based on the current position and orientation of the terminal. The angle provided by the two antennas is determined as the arrival angle. In an implementation procedure, the position and the orientation of the terminal is monitored. If the position and the orientation of the terminal change, the two antennas are horizontal with respect to each other are determined in time to determine a correct arrival angle.

In some embodiments, the distance and direction measuring module includes an UWB (ultra-wideband band) positioning module.

In formation of distance and angle is obtained from the UWB positioning module. A positioning system based on satellites and base stations, such as GPS (global position system), has blind spots for indoor positioning. Because signals of the satellites and the base stations are difficult to penetrate buildings, it is impossible to achieve accurate indoor positioning. Positioning methods based on Wi-Fi and Bluetooth technologies are suitable for indoor positioning technology, but positioning accuracies of the Wi-Fi and Bluetooth technologies are lower than that of the UWB positioning module.

The UWB is a wireless carrier communication technology with a short distance. Instead of using a sinusoidal carrier in a conventional communication system, data is transmitted by sending and receiving extremely narrow pulses of nanoseconds or below, thereby having a bandwidth on the order of GHz. In this way, major problems related to propagation that have puzzled conventional wireless communication technologies for years are solved, and advantages such as high data transmission rate, low power consumption, low cost, strong penetration ability, good anti-multipath effect and high security are provided. Using the UWB positioning module as the distance and direction measuring module may sense nearby terminals equipped with the UWB positioning module, accurately determine a position relationship of the terminals, and have accurate positioning and high precision.

In some embodiments of the present disclosure, the UWB positioning module of the operation implementing device may include two or more antennas, and the UWB positioning module of the target operation device may include one or more antennas.

It may be understood, when the UWB positioning module of the operation implementing device includes two antennas, the two antennas may be configured to determine the angle of the target operation device with respect to the operation implementing device. That is, the target operation device may be located at any point on a track of a bottom circle of a circular cone that takes a midpoint of the two antennas of the operation implementing device as a vertex, the central axis of the operation implementation device as an axis, and the angle as a half-angle of projection.

When the UWB positioning module of the operation implementing device includes three antennas, a three-dimensional positioning of the target operation device with respect to the operation implementing device may be implemented. There may be two or three conical surfaces taking midpoints of every two antennas in the three antennas of the operation implementing device as vertices. Intersection points of the conical surfaces with different vertices are accurate position of the target operation device with respect to the operation implementing device.

When the antenna of the UWB positioning module of the operation implementing device is disposed on a rear surface of the operation implementing device, and the UWB positioning module is configured to determine the position of the target operation device, the operation implementing device keeps to be vertical if necessary, i.e., perpendicular to the horizontal plane, such that the antenna faces the target operation device.

When the antenna of the UWB positioning module of the operation implementing device is disposed on the top of the operation implementing device, and the UWB positioning module is configured to determine the position of the target operation device, the operation implementing device may be vertical or horizontal, such that the antenna faces the target operation device.

Figure 12A:
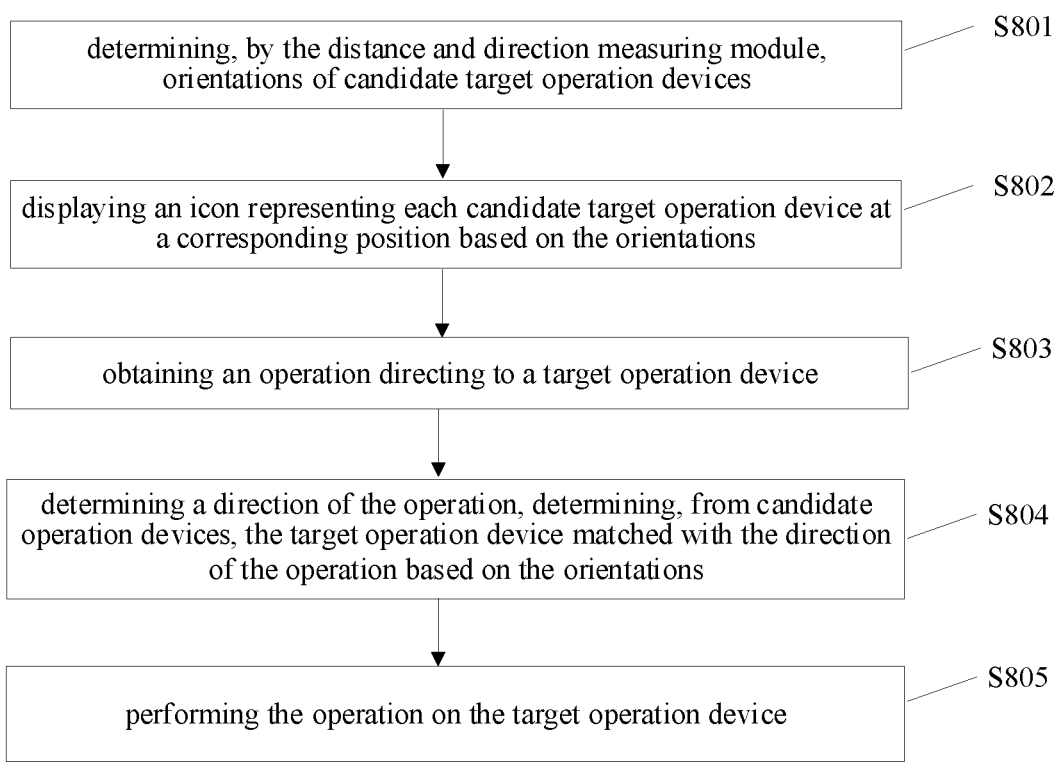
FIG. 12A is a flowchart illustrating a method for performing a directional operation according to some embodiments of the present disclosure.

FIG. 12A is a flowchart illustrating a method for performing a directional operation according to some embodiments of the present disclosure. As illustrated in FIG. 12, the method for performing the directional operation may include the following.

At block S801, orientations of multiple candidate target operation devices are determined by the distance and direction measuring module.

The orientation includes the distance and/or the angle of the operation implementing device with respect to the target operation device. Taking FIG. 2 as an example, the direction measuring signal is transmitted between the UWB positioning module of the terminal A and the UWB positioning modules of the terminal B, the terminal C and the terminal D to perform the distance and direction measuring operation and to obtain the distances and/or the angles of the terminal B, the terminal C and the terminal D with respect to the terminal A. The target operation device matched with the direction of the operation directing to the target direction device is determined by utilizing the distances and/or the angles of the terminal B, the terminal C and the terminal D with respect to the terminal A.

The orientations of the multiple candidate target operation devices may be determined by the distance and direction measuring module in the following ways. As discussed above, the transmission directions of the direction measuring signals from the multiple candidate target operation devices may be obtained, the straight line where the transmission direction is located is projected onto the horizontal plane, the angle of the projection with respect to the preset reference direction of the measuring distance and direction is obtained, and the orientations of the multiple candidate target operation devices with respect to the operation implementing device are obtained. As another example, the arrival angles corresponding to the multiple candidate target operation devices are obtained, and the orientations of the multiple candidate target operation devices with respect to the operation implementing device are determined based on the arrival angles. Details may refer to the above discussions, which may not be elaborated here.

At block S802, an icon representing the candidate target operation device is displayed at a corresponding position on a display interface of the operation implementing device based on the orientations.

Figure 12B:
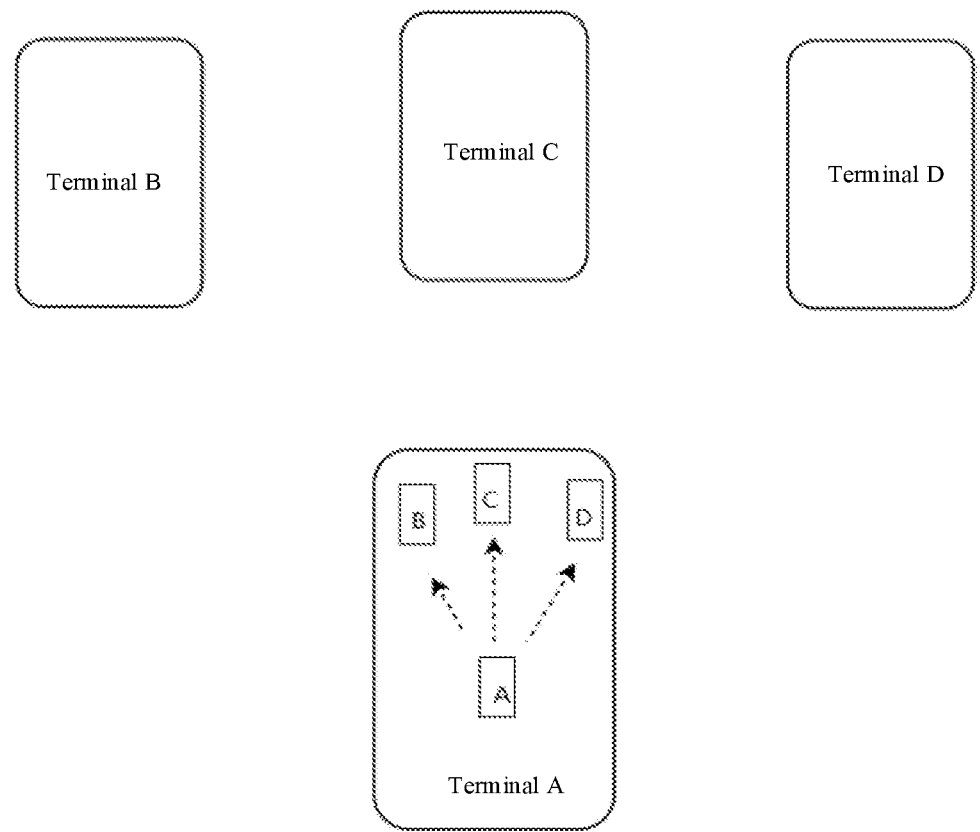
FIG. 12B is a schematic diagram illustrating orientations of terminals according to some embodiments of the present disclosure.

In some embodiments of the present disclosure, the operation implementing device (terminal A) may perform operations on the terminals B, C and/or D. Information of the orientations of the terminals B, C and D may be schematically displayed by the operation implementing device (terminal A). As illustrated in FIG. 12B, icons of the terminals B, C and D may be displayed on corresponding positions based on the orientations. A user may intuitively sense relative orientation relationships of the terminals B, C and D with respect to the user, and direct to the operation of the target operation device based on the orientations to determine the target operation device.

In some embodiments of the present disclosure, relative distances and angles of the terminals B, C and D with respect to the terminal A may also be displayed in a list on the terminal A, such that the display is more concise, and it is convenient to provide the user with the orientations of the target operation devices when there are the multiple target operation devices.

In the implementation, for example, the method for performing the directional operation according to embodiments of the present disclosure is implemented by a preset application (APP). Blocks S801 and S802 may be triggered in response to launching the APP or entering an interface for implementing the method for performing the directional operation.

At block S803, the operation directing to the target operation device is obtained.

At block S804, the direction of the operation is determined, and the target operation device matched with the direction of the operation is determined from the multiple candidate target operation devices.

At block S805, the operation is performed on the target operation device.

Figure 13:
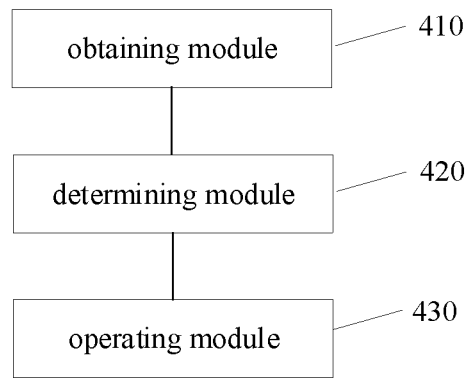
FIG. 13 is a block diagram illustrating an apparatus for performing a directional operation according to some embodiments of the present disclosure.

FIG. 13 is a block diagram illustrating an apparatus for performing a directional operation according to some embodiments of the present disclosure. The apparatus for performing the directional operation is integrated in an operation implementing device. Referring to FIG. 13, the apparatus 400 for performing the directional operation may include an obtaining module 410, a determining module 420, and an operating module 430.

The obtaining module 410 is configured to obtain an operation directing to a target operation device.

The determining module 420 is configured to determine a direction of the operation, and to determine a target operation device matched with the direction of the operation.

The operation module 430 is configured to perform the operation on the target operation device.

In some embodiments, the operation implementing device may include a distance and direction measuring module. While determining the target operation device matched with the direction of the operation, the determining module 420 is configured to: determine an orientation range where the target operation device is located based on the direction of the operation; and within the orientation range, determine, by the distance and direction measuring module, the target operation device matched with the direction of the operation.

In some embodiments, the operation implementing device may include a distance and direction measuring module. The determining module 420 is further configured to determine, by the distance and direction measuring module, orientations of multiple candidate target operation devices. While determining the target operation device matched with the direction of the operation, the determining module is further configured to: determine, from the multiple candidate target operation devices, the target operation device matched with the direction of the operation based on the orientations.

In some embodiments, while determining the target operation device matched with the direction of the operation, the determining module 420 is configured to: in response to determining that the direction of the operation and an orientation of a candidate target operation device with respect to the operation implementing device conform to a preset angle relationship, determine the candidate target operation device as the target operation device; or in response to determining that the direction of the operation and an orientation of a candidate target operation device with respect to the operation implementing device conform to a preset angle relationship, as well as a distance from the candidate target operation device to the operation implementing device conforms to a preset distance condition, determine the candidate target operation device as the target operation device.

In some embodiments, for determining the candidate target operation device as the target operation device in response to determining that the direction of the operation and the orientation of the candidate target operation device with respect to the operation implementing device conform to the preset angle relationship, as well as the distance from the candidate target operation device to the operation implementing device conforms to the preset distance condition, the determining module 420 is configured to: in response to determining that the direction of the operation and orientations of at least two candidate target operation devices with respect to the operation implementing device conform to the preset angle relationship, determine distances between the operation implementing device and the at least two candidate target operation devices; based on a preset correspondence between a length of an operation and the distance, determine, from the at least two candidate target operation devices, a candidate target operation device as the target operation device if the distance from the operation implementing device to the candidate target operation device matches with the length of the operation; or based on a preset correspondence between a gesture of an operation and the distance, determine, from the at least two candidate target operation devices, a candidate target operation device as the target operation device if the distance from the operation implementing device to the candidate target operation device matches with the gesture of the operation.

In some embodiments, the orientation of the target operation device with respect to the operation implementing device includes a transmission direction of a direction measuring signal transmitted between the target operation device and the operation implementing device. In response to determining the direction of the operation, the determining module 420 is configured to: determine a first angle between the direction of the operation and a reference direction of a preset operation. Determining the candidate target operation device as the target operation device if the direction of the operation and the orientation of the candidate target operation device with respect to the operation implementing device conform to the preset angle relationship includes: determining a second angle between a preset reference direction of measuring the distance and direction and a projection, on a horizontal plane, of the transmission direction of the direction measuring signal transmitted between each candidate target operation device and the operation implementing device; and determining the candidate target operation device corresponding to the second angle as the target operation device if a difference between the first angle and the second angle conforms to the preset angle relationship.

In some embodiments, the reference direction of the preset operation includes: a direction along a central axis of the operation implementing device, or a direction perpendicular to the direction along the central axis and within a plane where the operation implementing device is located. The preset reference direction of measuring the distance and direction includes: the direction along the central axis of the operation implementing device; the direction perpendicular to the direction along the central axis and within the plane where the operation implementing device is located; or a direction of an intersection line between a horizontal plane and a plane parallel to the central axis or containing the central axis and perpendicular to the plane where the operation implementing device is located.

In some embodiments, the orientation of the target operation device with respect to the operation implementing device includes an arrival angle of a direction measuring signal arriving at the operation implementing device. In response to determining the direction of the operation, the determining module 420 is configured to: determine a third angle between the direction of the operation and a reference direction of a preset operation. Determining the candidate target operation device as the target operation device, if the direction of the operation and the orientation of the candidate target operation device with respect to the operation implementing device conform to the preset angle relationship includes: determining an arrival angle of the direction measuring signal transmitted between each candidate target operation device and the operation implementing device arriving at the operation implementing device; and determining the candidate target operation device corresponding to the arrival angle as the target operation device, if the arrival angle corresponding to the candidate target operation device and the third angle conform to the preset angle relationship.

In some embodiments, the determining module 420 is configured to determine the arrival angle by: determining, from multiple antennas included in the distance and direction measuring module of the operation implementing device, two antennas such that a direction of a connection line of the two antennas are horizontal based on current position and orientation of the operation implementing device; and determining the arrival angle based on angles of the direction measuring signals arriving at the operation implementing device determined by the two antennas.

In some embodiments, the distance and direction measuring module includes a UWB positioning module.

Figure 14:
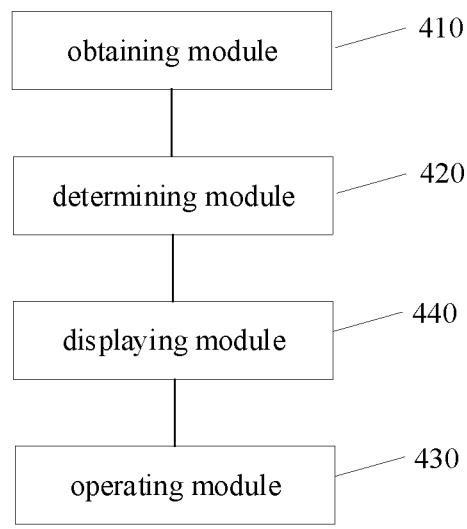
FIG. 14 is a block diagram illustrating an apparatus for performing a directional operation according to some embodiments of the present disclosure.

FIG. 14 is a block diagram illustrating an apparatus for performing a directional operation according to some embodiments of the present disclosure. As illustrated FIG. 14, the apparatus 400 for performing the directional operation further includes a displaying module 440.

The displaying module 440 is configured to display an icon for the candidate target operation device at a corresponding position based on the orientations.

Regarding the apparatus in the above embodiments, details of implementations of each module are described in embodiments related to the method, which are not elaborated in detail here.

Figure 15:
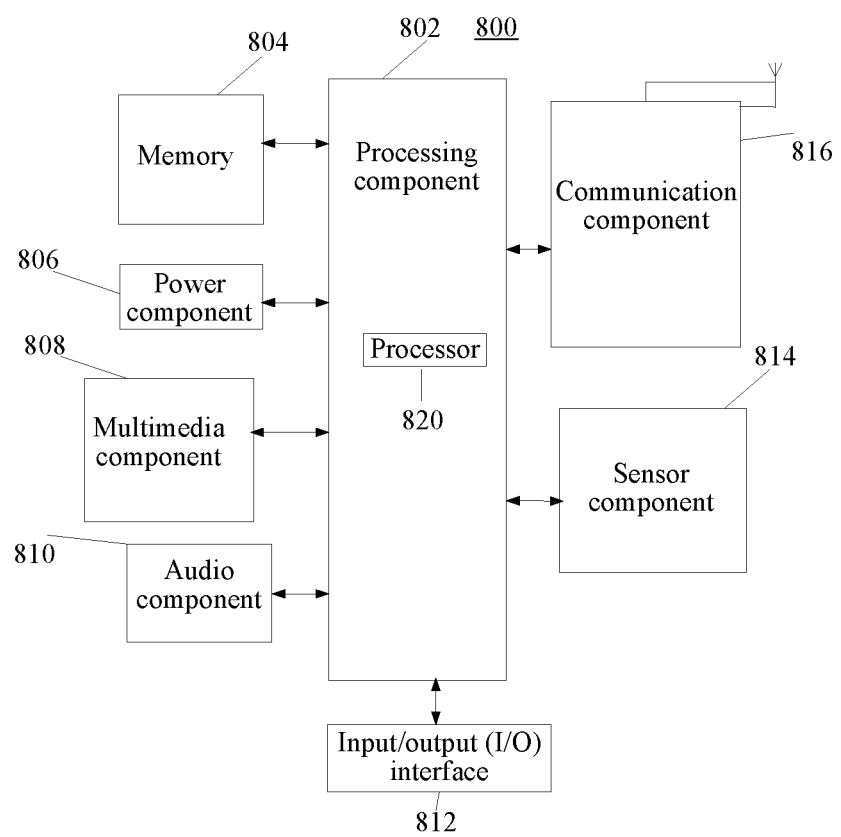
FIG. 15 is a block diagram illustrating a device according to some embodiments of the present disclosure.

FIG. 15 is a block diagram illustrating a device for performing a directional operation according to some embodiments of the present disclosure. For example, the device 800 for performing the directional operation may be a mobile phone, a computer, a digital broadcasting terminal, a message sending and receiving equipment, a game controller, a tablet device, a medical device, a fitness equipment, a personal digital assistant or the like.

As illustrated in FIG. 15, the device 800 for performing the directional operation may include one or more of the following components: a processing component 802, a memory 804, a power component 806, a multimedia component 808, an audio component 810, an input/output (I/O) interface 812, a sensor component 814, and a communication component 816.

The processing component 802 typically controls overall operations of the device 800 for performing the directional operation, such as the operations associated with display, telephone calls, data communications, camera operations, and recording operations. The processing component 802 may include one or more processors 820 to execute instructions to perform all or part of the steps in the above described methods. Moreover, the processing component 802 may include one or more modules which facilitate the interaction between the processing component 802 and other components. For example, the processing component 802 may include a multimedia module to facilitate the interaction between the multimedia component 808 and the processing component 802.

The memory 804 is configured to store various types of data to support the operation of the device 800 for performing the directional operation. Examples of such data include instructions for any applications or methods operated on the device 800 for performing the directional operation, contraction data, phonebook data, messages, pictures, video, etc. The memory 804 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 is configured to provide power to various components of the device 800 for performing the directional operation. The power component 806 may include a power management system, one or more power sources, and any other components associated with the generation, management, and distribution of power in the device 800 for performing the directional operation.

The multimedia component 808 includes a screen providing an output interface between the device 800 for performing the directional operation and the user. In some embodiments, the screen may include a liquid crystal display (LCD) and a touch panel (TP). In some embodiments, an organic light-emitting diode (OLED) display or other types of displays can be employed.

If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 808 includes a front camera and/or a rear camera. The front camera and the rear camera may receive an external multimedia datum while the device 800 for performing the directional operation is in an operation mode, such as a photographing mode or a video mode. Each of the front camera and the rear camera may be a fixed optical lens system or have focus and optical zoom capability.

The audio component 810 is configured to output and/or input audio signals. For example, the audio component 810 includes a microphone ("MIC") configured to receive an external audio signal when the device 800 for performing the directional operation is in an operation mode, such as a call mode, a recording mode, and a voice recognition mode. The received audio signal may be further stored in the memory 804 or transmitted via the communication component 816. In some embodiments, the audio component 810 further includes a speaker to output audio signals.

The I/O interface 812 is configured to provide an interface between the processing component 802 and peripheral interface modules, such as a keyboard, a click wheel, buttons, and the like. The buttons may include, but be not limited to, a home button, a volume button, a starting button, and a locking button.

The sensor component 814 includes one or more sensors to provide status assessments of various aspects of the device 800 for performing the directional operation. For example, the sensor component 814 may detect an open/closed status of the device 800, relative positioning of components, e.g., the display and the keypad of the device 800 for performing the directional operation, a change in position of the device 800 for performing the directional operation or a component of the device 800 for performing the directional operation, a presence or absence of user contraction with the device 800 for performing the directional operation, an orientation or an acceleration/deceleration of the device 800 for performing the directional operation, and a change in temperature of the device 800 for performing the directional operation. The sensor component 814 may include a proximity sensor configured to detect the presence of nearby objects without any physical contact. The sensor component 814 may also include a light sensor, such as a CMOS (complementary metal-oxide-semiconductor)) or CCD (charge coupled device) image sensor, for use in imaging applications. In some embodiments, the sensor component 814 may also include an accelerometer sensor, a gyroscope sensor, a magnetic sensor, a pressure sensor, or a temperature sensor.

The communication component 816 is configured to facilitate communication, wired or wirelessly, between the device 800 for performing the directional operation and other devices. The device 800 for performing the directional operation may access a wireless network based on a communication standard, such as Wi-Fi, 2G, 3G, 4G, 5G, or a combination thereof.

In some embodiments, the communication component 816 receives a broadcast signal or broadcast associated information from an external broadcast management system via a broadcast channel. In some embodiments, the communication component 816 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In some embodiments, the device 800 for performing the directional operation may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In some embodiments, there is also provided a non-transitory computer-readable storage medium including instructions, such as included in the memory 804, executed by the processor 820 in the device 800 for performing the directional operation, for performing the above-described methods. For example, the non-transitory computer-readable storage medium may be a ROM, a RAM, a CD-ROM, a magnetic tape, a floppy disc, an optical data storage device, and the like.

The various device components, circuits, modules, units, blocks, or portions may have modular configurations, or are composed of discrete components, but nonetheless may be referred to as "modules" or "portions" in general. In other words, the "components," "circuits," "modules," "units," "blocks," or "portions" referred to herein may or may not be in modular forms, and these phrases may be interchangeably used.

The terms "first" and "second" are used for descriptive purposes only and are not to be construed as indicating or implying a relative importance or implicitly indicating the number of technical features indicated. Thus, elements referred to as "first" and "second" can include one or more of the features either explicitly or implicitly. In the description of the present disclosure, "a plurality" indicates two or more unless specifically defined otherwise.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

It is to be understood that "multiple" mentioned in the present disclosure refers to two or more than two. "And/or" describes an association relationship of associated objects and represent that three relationships can exist. For example, A and/or B can represent three conditions, i.e., independent existence of A, coexistence of A and B and independent existence of B. Character "/" usually represents that previous and next associated objects form an "or" relationship.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

What is claimed is:

1. A method for performing a directional operation, applied to an operation implementing device, wherein the method comprises:
    obtaining an operation having a direction;
    determining the direction of the operation, comprising:
        determining a third angle between the direction of the operation and a reference direction of a preset operation,
    determining a target operation device matched with the direction of the operation; and
    performing the operation on the target operation device;
    wherein said determining the target operation device matched with the direction of the operation comprises:
        determining, from a plurality of antennas comprised in the operation implementing device, two antennas based on current position and orientation of the operation implementing device, wherein a direction of a connection line of the two antennas is horizontal;
        re-determining two antennas from the plurality of antennas comprised in the operation implementing device, based on a change of the posture and orientation of the operation implementing device, wherein a direction of a connection line of re-determined two antennas is horizontal;
        determining an arrival angle based on an angle of a direction measuring signal arriving at the operation implementing device determined by the re-determined two antennas; and
        in response to determining that the third angle and the arrival angle corresponding to a candidate target operation device conform to a preset angle relationship, determining the candidate target operation device as the target operation device.

2. The method of claim 1, wherein
    the determining the target operation device matched with the direction of the operation comprises:
    determining an orientation range where the target operation device is located based on the direction of the operation; and
    within the orientation range, determining the target operation device matched with the direction of the operation.

3. The method of claim 1, wherein
    the method further comprises determining orientations of a plurality of candidate target operation devices; and
    determining the target operation device matched with the direction of the operation comprises: determining, from the plurality of candidate target operation devices, the target operation device matched with the direction of the operation, based on the orientations.

4. The method of claim 3, after the determining the orientations of the plurality of candidate target operation devices, further comprising:
    displaying an icon representing each candidate target operation device at a corresponding position on a display interface of the operation implementing device based on the orientations.

5. The method of claim 1, wherein the determining the target operation device matched with the direction of the operation comprises:
    in response to determining that the direction of the operation and an orientation of a candidate target operation device with respect to the operation implementing device conform to a preset angle relationship, as well as a distance from the candidate target operation device to the operation implementing device conforms to a preset distance condition, determining the candidate target operation device as the target operation device.

6. The method of claim 5, wherein in response to determining that the direction of the operation and the orientation of the candidate target operation device with respect to the operation implementing device conform to the preset angle relationship, as well as the distance from the candidate target operation device to the operation implementing device conforms to the preset distance condition, the determining the candidate target operation device as the target operation device comprises:
    in response to determining that the direction of the operation and orientations of at least two candidate target operation devices with respect to the operation implementing device conform to the preset angle relationship, determining distances between the operation implementing device and the at least two candidate target operation devices;
    based on a preset correspondence between a length of an operation and the distance, determining, from the at least two candidate target operation devices, a candidate target operation device as the target operation device, in response to determining that the distance from the operation implementing device to the candidate target operation device matches with the length of the operation; or based on a preset correspondence between a gesture of an operation and the distance, determining, from the at least two candidate target operation devices, a candidate target operation device as the target operation device, in response to determining that the distance from the operation implementing device to the candidate target operation device matches with the gesture of the operation.

7. The method of claim 1, wherein the orientation of the target operation device with respect to the operation implementing device comprises a transmission direction of a direction measuring signal transmitted between the target operation device and the operation implementing device;

wherein the method further comprises: determining a first angle between the direction of the operation and a reference direction of a preset operation; and determining a second angle between a preset reference direction of measuring the distance and direction and a projection, on a horizontal plane, of the transmission direction of the direction measuring signal transmitted between each candidate target operation device and the operation implementing device; and in response to determining that a difference between the first angle and the second angle conforms to the preset angle relationship, determining the candidate target operation device corresponding to the second angle as the target operation device.

8. The method of claim 7, wherein the reference direction of the preset operation comprises: a direction along a central axis of the operation implementing device; or a direction perpendicular to the direction along the central axis and within a plane where the operation implementing device is located; and the preset reference direction of measuring the distance and direction comprises: the direction along the central axis of the operation implementing device; the direction perpendicular to the direction along the central axis and within the plane where the operation implementing device is located; or a direction of an intersection line between a horizontal plane and a plane parallel to the central axis or containing the central axis and perpendicular to the plane where the operation implementing device is located.

9. A device for performing a directional operation, comprising:

a processor; and memory, configured to store executable instructions by the processor;

wherein the processor is configured to:

obtain an operation having a direction;

determine the direction of the operation, comprising: determining a third angle between the direction of the operation and a reference direction of a preset operation, determine a target operation device matched with the direction of the operation; and perform the operation on the target operation device;

wherein the processor is further configured to:

determine, from a plurality of antennas comprised in the operation implementing device, two antennas based on current position and orientation of the operation implementing device, wherein a direction of a connection line of the two antennas is horizontal;

re-determine two antennas from the plurality of antennas comprised in the operation implementing device, based on a change of the posture and orientation of the operation implementing device, wherein a direction of a connection line of re-determined two antennas is horizontal, determine an arrival angle based on an angle of a direction measuring signal arriving at the operation implementing device determined by the re-determined two antennas; and in response to determining that the third angle and the arrival angle corresponding to a candidate target operation device conform to a preset angle relationship, determine the candidate target operation device as the target operation device.

10. The device of claim 9, wherein the processor is configured to determine the target operation device matched with the direction of the operation by:

determining an orientation range where the target operation device is located based on the direction of the operation; and within the orientation range, determining the target operation device matched with the direction of the operation.

11. The device of claim 9, wherein the processor is further configured to: determine orientations of a plurality of candidate target operation devices; and the processor is configured to determine the target operation device matched with the direction of the operation by: determining, from the plurality of candidate target operation devices, the target operation device matched with the direction of the operation, based on the orientations.

12. The device of claim 9, wherein the processor is configured to determine the target operation device matched with the direction of the operation by:

in response to determining that the direction of the operation and an orientation of a candidate target operation device with respect to the operation implementing device conform to a preset angle relationship, as well as a distance from the candidate target operation device to the operation implementing device conforms to a preset distance condition, determining the candidate target operation device as the target operation device.

13. The device of claim 12, wherein the processor is configured to determine the candidate target operation device as the target operation device in response to determining that the direction of the operation and the orientation of the candidate target operation device with respect to the operation implementing device conform to the preset angle relationship, as well as the distance from the candidate target operation device to the operation implementing device conforms to the preset distance condition by:

in response to determining that the direction of the operation and orientations of at least two candidate target operation devices with respect to the operation implementing device conform to the preset angle relationship, determining distances between the operation implementing device and the at least two candidate target operation devices;

based on a preset correspondence between a length of an operation and the distance, determining, from the at least two candidate target operation devices, a candidate target operation device as the target operation device, in response to determining that the distance from the operation implementing device to the candidate target operation device matches with the length of the operation; or based on a preset correspondence between a gesture of an operation and the distance, determining, from the at least two candidate target operation devices, a candidate target operation device as the target operation device, in response to determining that the distance from the operation implementing device to the candidate target operation device matches with the gesture of the operation.

14. The device of claim 9, wherein the orientation of the target operation device with respect to the operation implementing device comprises a transmission direction of a direction measuring signal transmitted between the target operation device and the operation implementing device;

the processor is configured to determine a first angle between the direction of the operation and a reference direction of a preset operation; and determine a second angle between a preset reference direction of measuring the distance and direction and a projection, on a horizontal plane, of the transmission direction of the direction measuring signal transmitted between each candidate target operation device and the operation implementing device; and in response to determining that a difference between the first angle and the second angle conforms to the preset angle relationship, determine the candidate target operation device corresponding to the second angle as the target operation device.

15. The device of claim 14, wherein the reference direction of the preset operation comprises: a direction along a central axis of the operation implementing device; or a direction perpendicular to the direction along the central axis and within a plane where the operation implementing device is located; and the preset reference direction of measuring the distance and direction comprises: the direction along the central axis of the operation implementing device; the direction perpendicular to the direction along the central axis and within the plane where the operation implementing device is located; or a direction of an intersection line between a horizontal plane and a plane parallel to the central axis or containing the central axis and perpendicular to the plane where the operation implementing device is located.

16. A non-transitory computer readable storage medium, wherein when instructions in the storage medium are executed by a processor in a mobile terminal, the mobile terminal is enabled to implement a method for performing a direction, the method comprising:

obtaining an operation having a direction;

determining the direction of the operation, comprising:
  determining a third angle between the direction of the operation and a reference direction of a preset operation, determining a target operation device matched with the direction of the operation; and performing the operation on the target operation device;

wherein said determining the target operation device matched with the direction of the operation comprises:

determining, from a plurality of antennas comprised in the operation implementing device, two antennas based on current position and orientation of the operation implementing device, wherein a direction of a connection line of the two antennas is horizontal;

re-determining two antennas from the plurality of antennas comprised in the operation implementing device, based on a change of the posture and orientation of the operation implementing device, wherein a direction of a connection line of re-determined two antennas is horizontal;

determining an arrival angle based on an angle of a direction measuring signal arriving at the operation implementing device determined by the re-determined two antennas; and in response to determining that the third angle and the arrival angle corresponding to a candidate target operation device conform to a preset angle relationship, determining the candidate target operation device as the target operation device.

* * * * *